(12) United States Patent  
Liu et al.

(10) Patent No.: US 11,691,718 B2  
(45) Date of Patent: Jul. 4, 2023

(54) AERIAL VEHICLE

(71) Applicant: Toyota Motor Engineering & Manufacturing North America, Inc., Plano, TX (US)

(72) Inventors: Yanghe Liu, Ann Arbor, MI (US); Shailesh N. Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 48 days.

(21) Appl. No.: 17/514,080

(22) Filed: Oct. 29, 2021

(65) Prior Publication Data

US 2023/0133184 A1    May 4, 2023

(51) Int. Cl.
| | |
|---|---|
| B64C 25/00 | (2006.01) |
| B64C 25/60 | (2006.01) |
| B64C 39/02 | (2023.01) |
| B64F 1/00 | (2006.01) |
| B64C 25/32 | (2006.01) |
| B64U 10/13 | (2023.01) |
| B64U 50/19 | (2023.01) |

(52) U.S. Cl.
CPC ............ *B64C 25/60* (2013.01); *B64C 39/024* (2013.01); *B64F 1/007* (2013.01); *B64C 2025/008* (2013.01); *B64C 2025/325* (2013.01); *B64U 10/13* (2023.01); *B64U 50/19* (2023.01)

(58) Field of Classification Search
CPC .............. B64C 25/60; B64C 2025/008; B64C 2025/325; B64F 1/007; B64U 10/13; B64U 50/19; B64U 50/30; B64U 50/39; B64U 50/38; B64U 50/37; B64U 50/34
See application file for complete search history.

(56) References Cited

U.S. PATENT DOCUMENTS

| | | | |
|---|---|---|---|
| 10,418,853 | B2 | 9/2019 | Yang et al. |
| 2018/0095468 | A1* | 4/2018 | Yang ................. G05D 1/0676 |
| 2020/0307829 | A1* | 10/2020 | Smith .................... B64C 25/06 |
| 2021/0053677 | A1* | 2/2021 | Passley ................. B64U 10/13 |
| 2021/0163135 | A1* | 6/2021 | Shin ..................... H01F 27/2871 |

FOREIGN PATENT DOCUMENTS

| | | |
|---|---|---|
| CN | 209320725 U | 8/2019 |
| CN | 211223076 U | 8/2020 |
| CN | 112389247 A | 2/2021 |
| CN | 212529334 U | 2/2021 |
| CN | 112440772 A | 3/2021 |
| KR | 101689768 B | 4/2013 |
| KR | 101670476 B1 | 10/2016 |

* cited by examiner

*Primary Examiner* — Tye William Abell  
(74) *Attorney, Agent, or Firm* — Christopher G. Darrow; Darrow Mustafa PC

(57) ABSTRACT

An aerial vehicle includes a body and a wireless charging receiver pad connected to the body, whereby the aerial vehicle is configured to be wirelessly charged when parked above a wireless charging transmitter pad. The aerial vehicle includes landing gear connected to the body and extending underneath the body. The landing gear is configured for actuation to control the location of the receiver pad with respect to the transmitter pad.

20 Claims, 3 Drawing Sheets

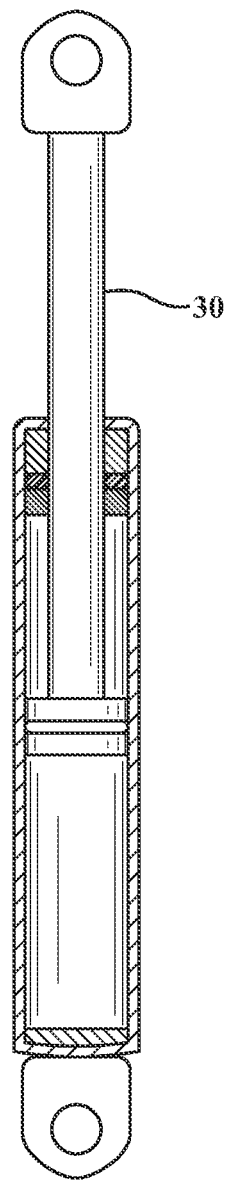
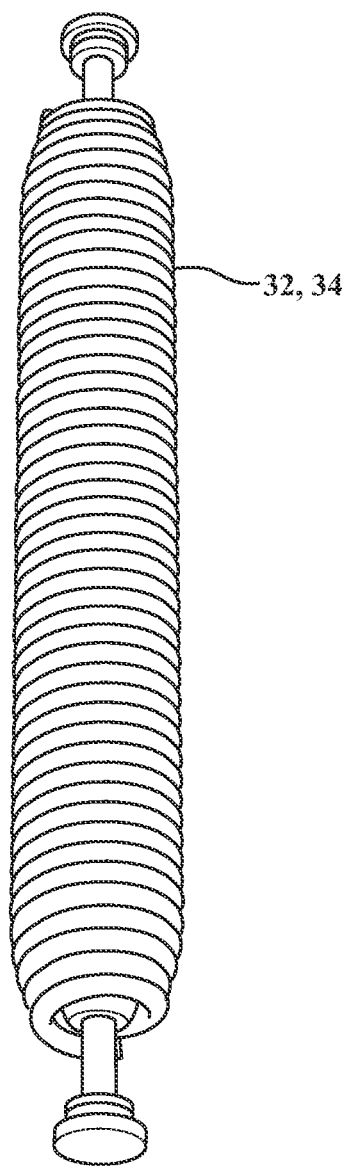
FIG. 2A
FIG. 2B

AERIAL VEHICLE

TECHNICAL FIELD

The embodiments disclosed herein relate to aerial vehicles and, more particularly, to wirelessly charging an aerial vehicle.

BACKGROUND

Aerial vehicles can include various different types of vehicles, including electric vertical takeoff and landing (eVTOL) vehicles, drones, unmanned aerial vehicles (UAVs), quadcopters, rotocraft, etc. Many of these types of vehicles are configured to be wirelessly charged by a wireless charging transmitter pad.

SUMMARY

Disclosed herein are embodiments of an aerial vehicle.

In one aspect, the present disclosure relates to an aerial vehicle. The aerial vehicle includes a body and a wireless charging receiver pad connected to the body, whereby the aerial vehicle is configured to be wirelessly charged when parked above a wireless charging transmitter pad. The aerial vehicle also includes landing gear connected to the body and extending underneath the body. The landing gear is configured for actuation to control the location of the receiver pad with respect to the transmitter pad.

In another aspect, the present disclosure relates to wireless charging system for an aerial vehicle. The aerial vehicle includes a body and a wireless charging receiver pad connected to the body, whereby the aerial vehicle is configured to be wirelessly charged when parked above a wireless charging transmitter pad. The aerial vehicle also includes landing gear connected to the body and extending underneath the body. The landing gear is configured for actuation relative to the body to control the location of the receiver pad with respect to the transmitter pad. The wireless charging system for the aerial vehicle also includes a computing device. The computing device is configured to determine an optimal location of the receiver pad with respect to the transmitter pad and actuate the landing gear based on the optimal location of the receiver pad with respect to the transmitter pad.

In yet another aspect, the present disclosure relates to a method for wirelessly charging an aerial vehicle. The aerial vehicle includes a body and a wireless charging receiver pad connected to the body, whereby the aerial vehicle is configured to be wirelessly charged when parked above a wireless charging transmitter pad. The aerial vehicle also includes landing gear connected to the body and extending underneath the body. The landing gear is configured for actuation to control the location of the receiver pad with respect to the wireless charging transmitter pad. The method includes determining an optimal location of the receiver pad with respect to the transmitter pad, and actuating the landing gear based on the optimal location of the receiver pad with respect to the transmitter pad.

These and other aspects will be described in additional detail below.

BRIEF DESCRIPTION OF THE DRAWINGS

The various features, advantages and other uses of the present embodiments will become more apparent by referring to the following detailed description and drawing in which:

FIG. 2A is a first example of the landing gear of the aerial vehicle.

FIG. 2B is a second example of the landing gear of the aerial vehicle.

DETAILED DESCRIPTION

This disclosure teaches a system and method for wirelessly charging an aerial vehicle. The aerial vehicle includes landing gear for parking above a wireless charging transmitter pad, which is configured to wirelessly charge the aerial vehicle through a wireless charging receiver pad connected to the aerial vehicle. The landing gear is configured for actuation to control the location of the aerial vehicle above the transmitter pad.

Figure 1A:
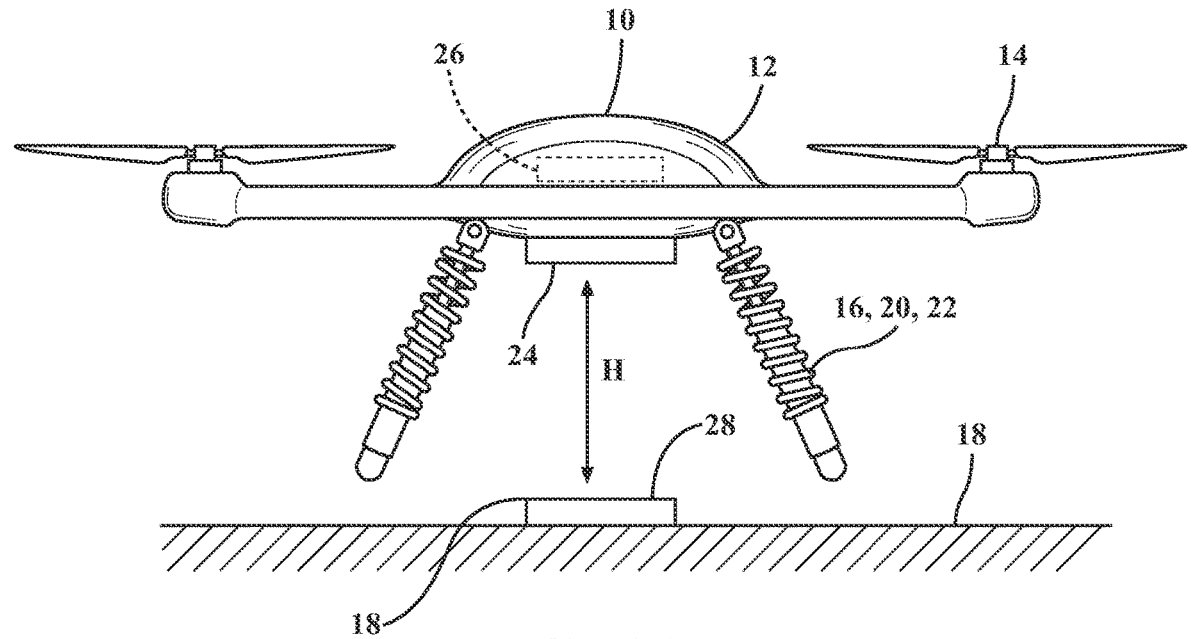
FIG. 1A is an example of an aerial vehicle including landing gear being parked above a wireless charging transmitter pad.
Figure 1B:
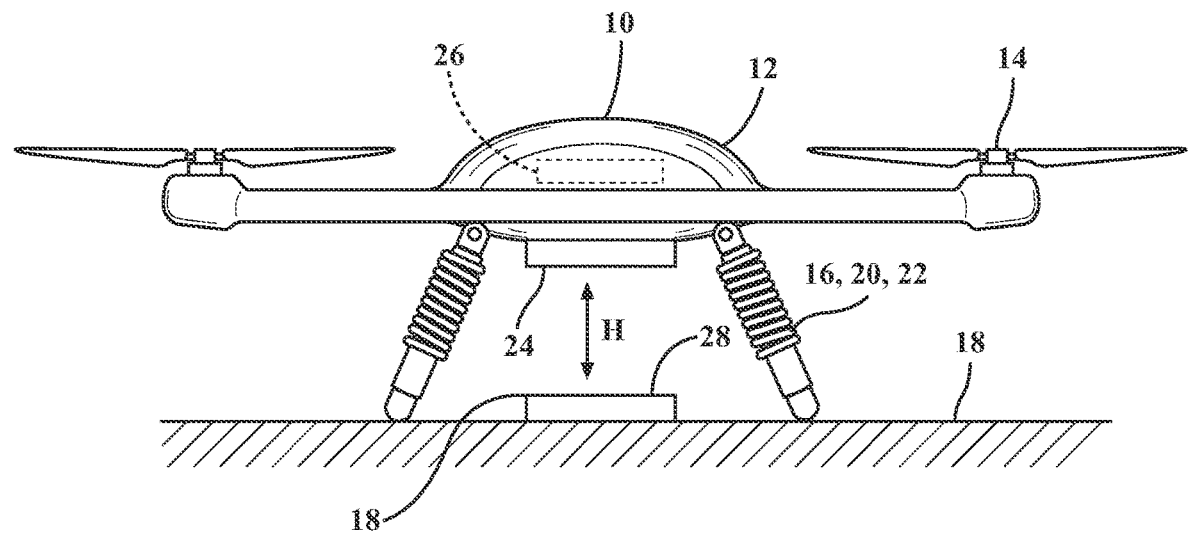
FIG. 1B is an example of an aerial vehicle including landing gear parked above a wireless charging transmitter pad.

Referring to FIGS. 1A and 1B, an example of an aerial vehicle 10 is shown. The aerial vehicle 10 can be any type of aerial vehicle, for example, an electric vertical takeoff and landing (eVTOL) vehicle, an unmanned aerial vehicle (UAV), a drone, a rotocraft, a quadcopter, etc. Among other components typical of aerial vehicles, the aerial vehicle 10 includes a body 12 with rotors 14 having motors and propellers. In some implementations, the aerial vehicle 10 can be configured to be remotely controlled. In other implementations, the aerial vehicle 10 can be autonomously controlled.

In addition to the body 12 and rotors 14, the aerial vehicle 10 includes landing gear 16. The landing gear 16 is connected to the body 12 and extends underneath the body 12, and is configured to support the body 12 on a landing surface 18. In some arrangements, the landing gear 16 can include one or more legs 20. As shown in FIGS. 1A and 1B, the landing gear 16 can include one or more springs 22, which can serve as the legs 20. In other arrangements, the landing gear 16 can include any suitable combination of leg(s) 20 and spring(s) 22, and in some arrangements, the spring(s) 22 can form a part of the leg(s) 20.

The aerial vehicle 10 is configured to be wirelessly charged using a wireless charging receiver pad 24, an electrical energy storage device 26 (e.g., a battery), and a wireless charging transmitter pad 28. The receiver pad 24 can be connected to the body 12, for example, underneath the body 12 or inside the body 12, and the electrical energy storage device 26 can be located in or on the body 12. The receiver pad 24 is configured to wirelessly charge the electrical energy storage device 26, for example, through magnetic induction, when placed above the transmitter pad 28. The transmitter pad 28 can be any suitable type of transmitter pad. For example, the transmitter pad 28 can be formed from magnetic coils that are configured in various patters (e.g., rectangles, circles, double DD orientation, etc.). The transmitter pad 28 can be located anywhere. For example, the transmitter pad 28 can be part of a network of transmitter pads placed throughout a city or other public spaces. For example, the transmitter pads 28 can be placed on various landing surfaces 18, including tops of buildings, in public parks, or underneath parking lots or sidewalks.

Accordingly, the aerial vehicle 10 can be configured to wirelessly charge whenever power is needed using any transmitter pad 28 located in these various areas.

The aerial vehicle 10 can be configured to park above the transmitter pad 28 in order to be charged. For example, the aerial vehicle 10 can park (e.g., land) directly on the transmitter pad 28, on a landing surface 18 surrounding the transmitter pad 28, or on a landing surface 18 above the transmitter pad 28, such as a parking lot or sidewalk. In other examples, the aerial vehicle 10 can park (e.g., fly) above the transmitter pad 28 during charging. When the aerial vehicle 10 parks above the transmitter pad 28 using the landing gear 16, the receiver pad 24 is located at a height H above the transmitter pad 28. As the height H increases above a certain threshold, or decreases below a certain threshold, the efficiency of the wireless charging may decrease. Accordingly, there is an optimal height H at which wireless charging is most efficient. The optimal height H may vary based on the type of transmitter pad 28 the aerial vehicle 10 is parked above and/or the type of receiver pad 24 located on the aerial vehicle 10. In some arrangements, the optimal height H is a range substantially between 100 millimeters (mm) and 170 mm above the transmitter pad 28. In other arrangements, the optimal height H is a range that can be up to substantially 250 mm above the transmitter pad 28. If the height is over 250 mm or under 100 mm above the transmitter pad 28, wireless charging may be ineffective.

Accordingly, the aerial vehicle 10 can be configured to adjust the height H of the receiver pad 24 above the transmitter pad 28. In order to adjust the height H, the landing gear 16 is configured for actuation. More specifically, the landing gear 16 is configured for extension and retraction relative to the body 12. For example, the landing gear 16 can be configured to rest on the landing surface 18 and lower the aerial vehicle 10 toward the landing surface 18 to control the height of the receiver pad 24 to the optimal height H above the transmitter pad 28. For example, the landing gear 16 can include legs 20 that are configured for extension and retraction relative to the body 12 in any suitable manner. In another example, as shown, the landing gear 16 can include springs 22 that are configured for actuation and for extension and retraction relative to the body 12. The springs 22 can be configured for extension and retraction in any suitable manner. For example, with reference to FIG. 2A, the springs 22 can be gas springs 30. In another example, with reference to FIG. 2B, the springs 22 can be electrically-controlled springs 32 or magnetically-controlled springs 34. The springs 22 can be extended and retracted after the aerial vehicle 10 parks above the transmitter pad 28 and before charging, or the springs 22 can be extended and retracted while the aerial vehicle 10 is parked above the transmitter pad 28 during charging.

In another implementation, the landing gear 16 can be configured to attach to the landing surface 18 and pull the aerial vehicle 10 toward the landing surface 18 to control the height of the receiver pad 24 to the optimal height H above the transmitter pad 28. For example, the landing gear 16 can attach to the transmitter pad 28, a landing surface 18 near the transmitter pad 28, or a landing surface 18 above the transmitter pad 28. In this implementation, the aerial vehicle 10 may be hovering or flying while charging, and the landing gear 16 (e.g., the springs 22) are configured to pull the aerial vehicle 10 towards the landing surface 18 to the control the height of the receiver pad 24 to the optimal height H above the transmitter pad 28.

Figure 3:
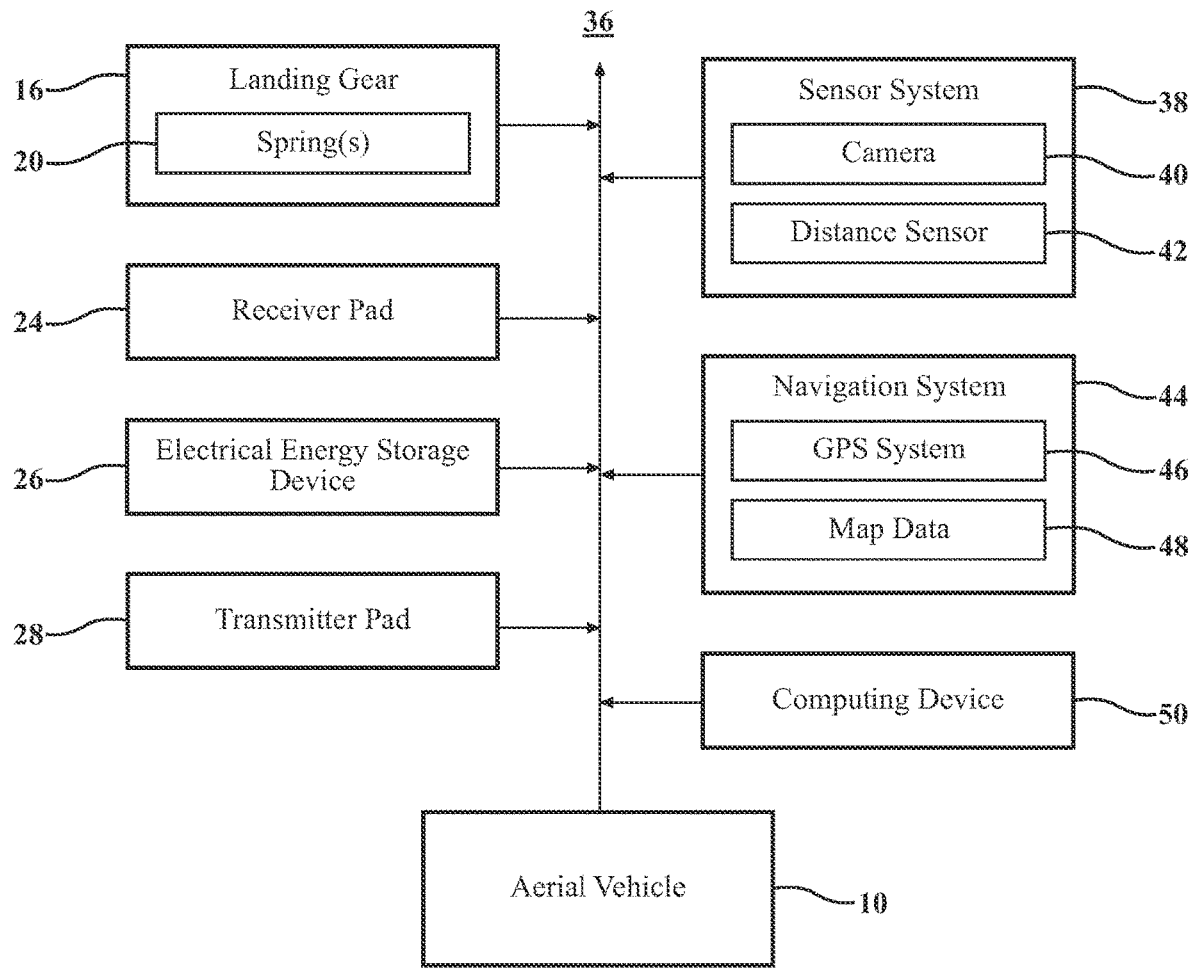
FIG. 3 is an example of an aerial vehicle wireless charging system.

As described above, the optimal height H may depend on the type of receiver pad 24 and/or transmitter pad 28 used during charging. Accordingly, the aerial vehicle 10 includes an aerial vehicle wireless charging system 36 configured to determine the optimal height H. Referring to FIG. 3, the aerial vehicle wireless charging system 36 can include a sensor system 38. The sensor system 38 can include a camera 40. The camera 40 can be configured to view the transmitter pad 28 and determine information about the transmitter pad 28, such as the type of transmitter pad 28 and/or where the transmitter pad 28 is located (e.g., above the landing surface 18 or underneath the landing surface 18). The sensor system 38 can also include a distance sensor 42 configured to determine the distance from the receiver pad 24 to the transmitter pad 28.

The aerial vehicle wireless charging system 36 can also include a navigation system 44. The navigation system 44 can be located on the aerial vehicle 10 or separate from the aerial vehicle 10 and can include, for example, a GPS system 46, map data 48, etc. The navigation system 44 can be configured to store and/or receive information about the network of transmitter pads, for example, where each transmitter pad 28 is located and what type of transmitter pad 28 the aerial vehicle 10 is parked above. In some arrangements, the transmitter pad 28 can also be configured to transmit information about the transmitter pad 28 to the aerial vehicle 10. Accordingly, the aerial vehicle 10 includes a computing device 50. The computing device 50 is communicatively connected to one or more components of the aerial vehicle wireless charging system 36, for example, the sensor system 38, the navigation system 44, etc.

The computing device 50 can be dedicated to actuating the landing gear 16, or could additionally support the operation of other systems of the aerial vehicle 10. The computing device 50 may include one or more processors communicatively coupled with a memory. The processor(s) may include any device capable of executing machine-readable instructions, which may be stored on a non-transitory computer-readable medium, for example, the memory. The processor(s) may include a controller, an integrated circuit, a microchip, a computer, and/or any other computing device.

The memory may include any type of computer readable medium suitable for storing data and algorithms. For example, the memory may include RAM, ROM, a flash memory, a hard drive, and/or any device capable of storing machine readable instructions. Various algorithms and data for actuating the landing gear 16 and/or for operating the sensor system 38 and/or the navigation system 44 may reside in whole or in part in the memory. The computing device 50 may, for instance, have a module residing in memory for actuating the landing gear 16 to control the height H at which the receiver pad 24 is located above the transmitter pad 28.

The module may be configured to receive and analyze data, signals, and/or other information from sensor system 38, the navigation system 44, and/or the computing device 50, and determine an optimal height H at which to position the receiver pad 24 above the transmitter pad 28. The module may include instructions for actuating the landing gear 16 based on the optimal height H. For example, if the aerial vehicle 10 parks above the transmitter pad 28 such that the receiver pad 24 is 100 mm above the transmitter pad 28, and the computing device 50 determines that the optimal height H is 170 mm, the computing device 50 can extend the landing gear 16 to increase the height H of the aerial vehicle 10, and thus the receiver pad 24, above the transmitter pad 28. In another example, if the aerial vehicle 10 parks above the transmitter pad 28 such that the receiver pad 24 is 170 mm above the transmitter pad 28, and the computing device 50 determines that the optimal height H is 140 mm, the computing device 50 can retract the landing gear 16 to decrease the height H of the aerial vehicle 10, and thus the receiver pad 24, above the transmitter pad 28.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps that are not shown here, and in fact, the method is not limited to including every step shown. The blocks that are illustrated here as part of the method are not limited to the particular chronological order. Indeed, some of the blocks may be performed in a different order than what is shown and/or at least some of the blocks shown can occur simultaneously.

Figure 4:
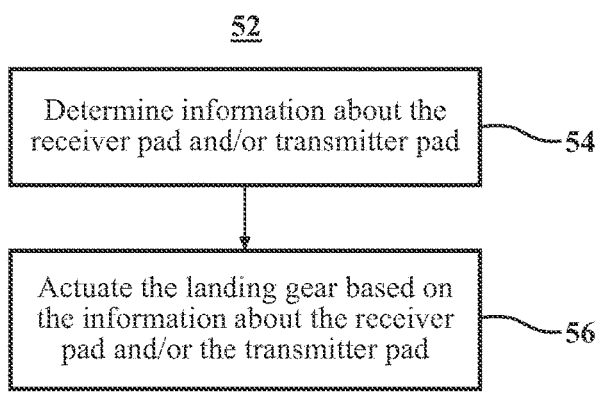
FIG. 4 is an example of a method of wirelessly charging an aerial vehicle.

Referring to FIG. 4, an example of a method 52 for wirelessly charging the aerial vehicle 10 is shown. In operation 54, the aerial vehicle 10 can determine information about the receiver pad 24 and/or the transmitter pad 28. For example, the aerial vehicle 10 can use the sensor system 38, the navigation system 44, and/or the computing device 50 to determine information about the receiver pad 24 and/or the transmitter pad 28. Based on this information, the computing device 50 can determine the optimal height H at which the receiver pad 24 should be located above the transmitter pad 28. In operation 56, based on the optimal height H, the aerial vehicle 10 can be configured to actuate the landing gear 16. For example, the computing device 50 can cause the legs 20 and/or the springs 22 of the landing gear 16 to be extended and/or retracted to control the height H of the receiver pad 24 to the optimal height H above the transmitter pad 28.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An aerial vehicle, comprising:
a body;
a wireless charging receiver pad connected to the body, whereby the aerial vehicle is configured to be wirelessly charged when parked above a wireless charging transmitter pad; and
landing gear connected to the body and extending underneath the body, and configured for actuation to control the location of the receiver pad with respect to the transmitter pad by moving the aerial vehicle with respect to a landing surface when the aerial vehicle is parked on the landing surface to control the height of the receiver pad to an optimal height above the transmitter pad.

2. The aerial vehicle of claim 1, wherein the landing gear includes at least one of a gas spring, an electrically-controlled spring, and a magnetically-controlled spring.

3. The aerial vehicle of claim 1, wherein the aerial vehicle is configured to be wirelessly charged when landed above the transmitter pad, and wherein the landing gear is configured to rest on the landing surface and control the height of the receiver pad to an optimal height above the transmitter pad by lowering the aerial vehicle toward the landing surface.

4. The aerial vehicle of claim 1, wherein the aerial vehicle is configured to be wirelessly charged while flying above the transmitter pad, and wherein the landing gear is configured to attach to the landing surface and control the height of the receiver pad to an optimal height above the transmitter pad by pulling the aerial vehicle toward the landing surface.

5. The aerial vehicle of claim 1, wherein the landing gear is configured for extension and retraction relative to the body to control the height of the receiver pad above the transmitter pad.

6. The aerial vehicle of claim 5, wherein the height is in the range of 100 mm to 170 mm.

7. The aerial vehicle of claim 5, wherein the height is under 250 mm.

8. An aerial vehicle wireless charging system, comprising:
an aerial vehicle comprising:
a body;
a wireless charging receiver pad connected to the body, whereby the aerial vehicle is configured to be wirelessly charged when parked above a wireless charging transmitter pad; and
landing gear connected to the body and extending underneath the body, and configured for actuation relative to the body to control the location of the receiver pad with respect to the transmitter pad by moving the aerial vehicle with respect to a landing surface when the aerial vehicle is parked on the landing surface to control the height of the receiver pad to an optimal height above the transmitter pad; and
a computing device configured to determine an optimal location of the receiver pad with respect to the transmitter pad and configured to actuate the landing gear based on the optimal location of the receiver pad with respect to the transmitter pad.

9. The aerial vehicle of claim 8, wherein the aerial vehicle is configured to be wirelessly charged when landed above the transmitter pad, and wherein the landing gear is configured to rest on the landing surface and control the height of the receiver pad to an optimal height above the transmitter pad by lowering the aerial vehicle toward the landing surface.

10. The aerial vehicle of claim 8, wherein the aerial vehicle is configured to be wirelessly charged while flying above the transmitter pad, and wherein the landing gear is configured to attach to the landing surface and control the height of the receiver pad to an optimal height above the transmitter pad by pulling the aerial vehicle toward the landing surface.

11. The aerial vehicle of claim 8, wherein the landing gear includes at least one of a gas spring, an electrically-controlled spring, and a magnetically-controlled spring.

12. The aerial vehicle wireless charging system of claim 8, wherein the computing device is configured to determine information about the transmitter pad and further comprising:
a sensor system including at least one of a camera and a distance sensor and configured to determine information about the transmitter pad.

13. The aerial vehicle wireless charging system of claim 12, wherein the optimal location of the receiver pad with respect to the transmitter pad is based on the information about at least one of the receiver pad and the transmitter pad.

14. The aerial vehicle wireless charging system of claim 8, wherein the landing gear is configured for extension and retraction relative to the body to control the height of the receiver pad above the transmitter pad.

15. The aerial vehicle of claim 14, wherein the height is in the range of 100 mm to 170 mm.

16. The aerial vehicle of claim 14, wherein the height is under 250 mm.

17. A method for wirelessly charging an aerial vehicle comprising a body, a wireless charging receiver pad connected to the body, whereby the aerial vehicle is configured to be wirelessly charged when parked above a wireless charging transmitter pad, and landing gear connected to the body and extending underneath the body and configured for actuation to control the location of the receiver pad with respect to the wireless charging transmitter pad by moving the aerial vehicle with respect to a landing surface when the aerial vehicle is parked on the landing surface to control the height of the receiver pad to an optimal height above the transmitter pad, the method comprising:

determining an optimal location of the receiver pad with respect to the transmitter pad; and actuating the landing gear based on the optimal location of the receiver pad with respect to the transmitter pad.

18. The method of claim 17, wherein determining an optimal location of the receiver pad with respect to the transmitter pad includes determining an optimal height of the receiver pad above the transmitter pad.

19. The method of claim 17, wherein determining an optimal location of the receiver pad with respect to the transmitter pad includes determining, using at least one of a sensor system and a computing device, information about at least one of the receiver pad and the transmitter pad.

20. The method of claim 17, wherein the landing gear includes at least one of a gas spring, an electrically-controlled spring, and a magnetically-controlled spring, and wherein actuating the landing gear based on the optimal location of the receiver pad with respect to the transmitter pad includes extending and retracting the springs.

* * * * *